No. 879,112. PATENTED FEB. 11, 1908.
M. MILLER.
WATER PURIFYING APPARATUS.
APPLICATION FILED MAR. 26, 1907.
4 SHEETS—SHEET 1.
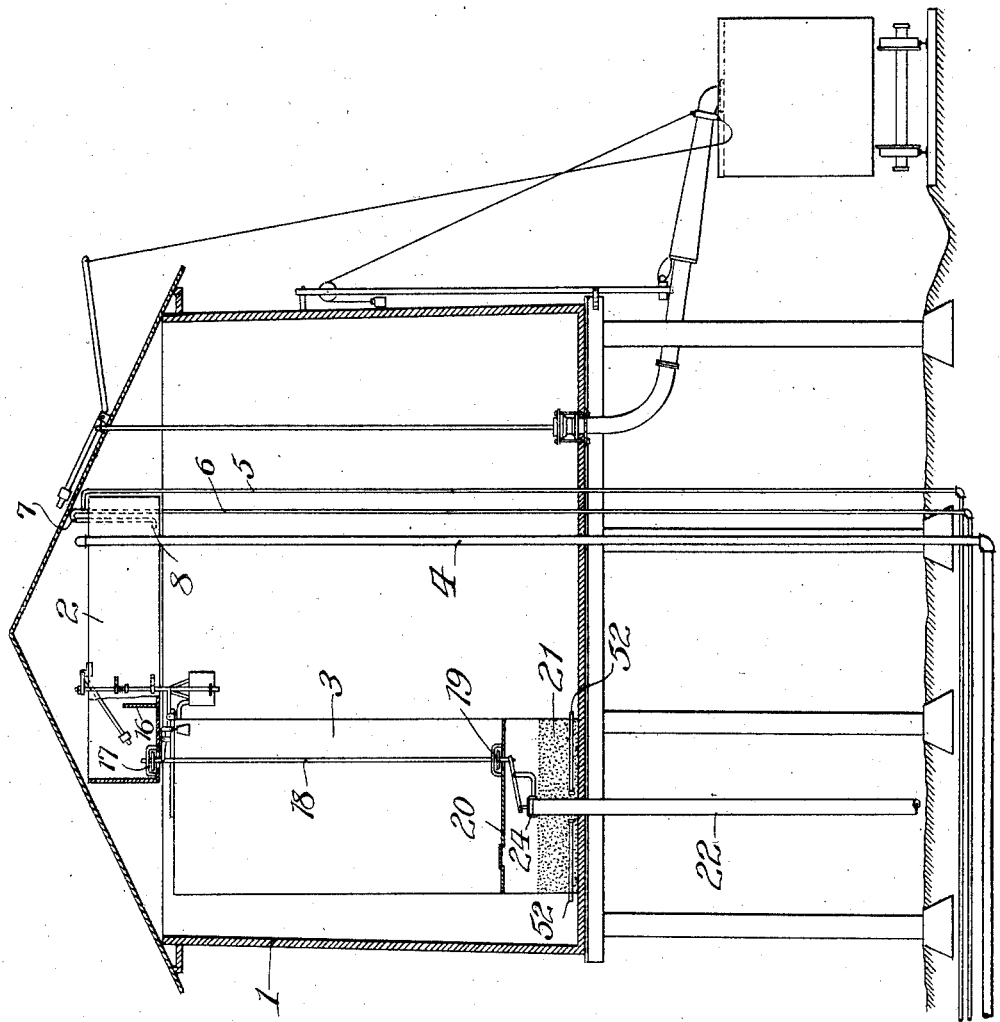
Fig. 1.
Witnesses:
Chas. E. Gaylord,
John Enders.
Inventor:
Marshall Miller,
By Thomas F. Sheridan,
Atty.
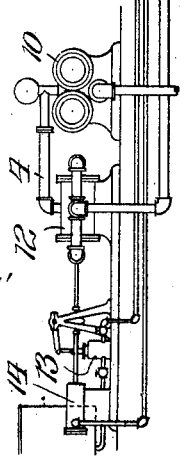

No. 879,112. PATENTED FEB. 11, 1908.
M. MILLER.
WATER PURIFYING APPARATUS.
APPLICATION FILED MAR. 26, 1907.

4 SHEETS—SHEET 3.

Witnesses:
Inventor:
Marshall Miller,
By Thomas F. Sheridan,
Att'ys

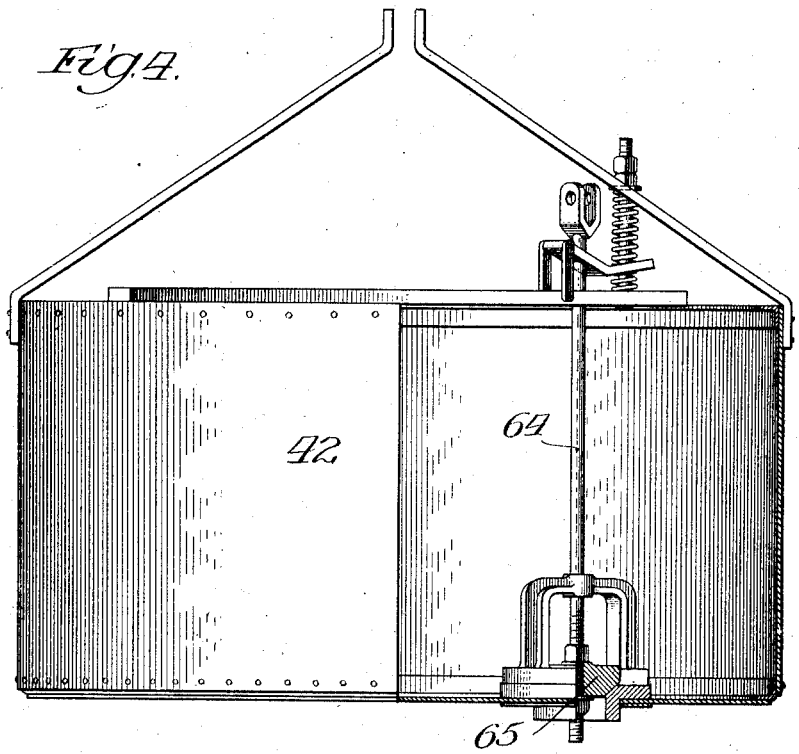
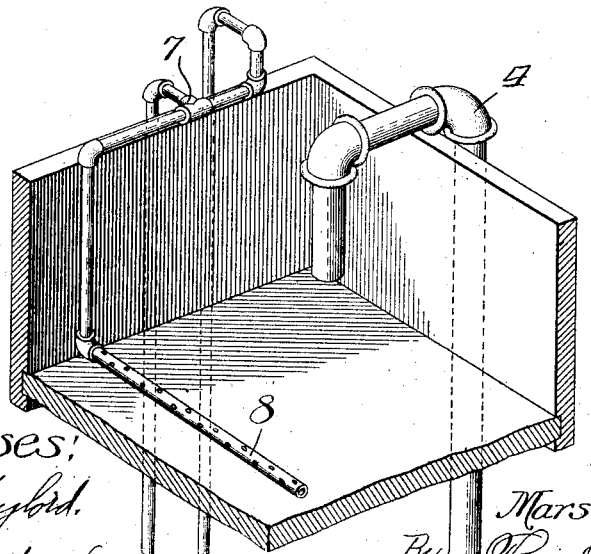

UNITED STATES PATENT OFFICE.

MARSHALL MILLER, OF ST. LOUIS, MISSOURI.

WATER-PURIFYING APPARATUS.

No. 879,112.   Specification of Letters Patent.   Patented Feb. 11, 1908.

Application filed March 26, 1907. Serial No. 364,643.

*To all whom it may concern:*

Be it known that I, MARSHALL MILLER, a citizen of the United States, residing in the city of St. Louis, State of Missouri, have invented certain new and useful Improvements in Water-Purifying Apparatus, of which the following is a specification.

The object of my invention is to provide improved means for filtering water for use in railway roadside tanks.

My invention comprises, among other things, means for automatically reversing the flow of water through the filter, thereby cleansing the same and discharging the sludge into the drain pipe, and also means for automatically restoring the normal operation of the filter. As is well-known, plants of this kind are placed in charge of unskilled workmen who cannot be trusted to cleanse the filters when necessary. In my improved apparatus the cleansing of the filter and the restoration thereof to normal operation is accomplished automatically.

Figure 2:
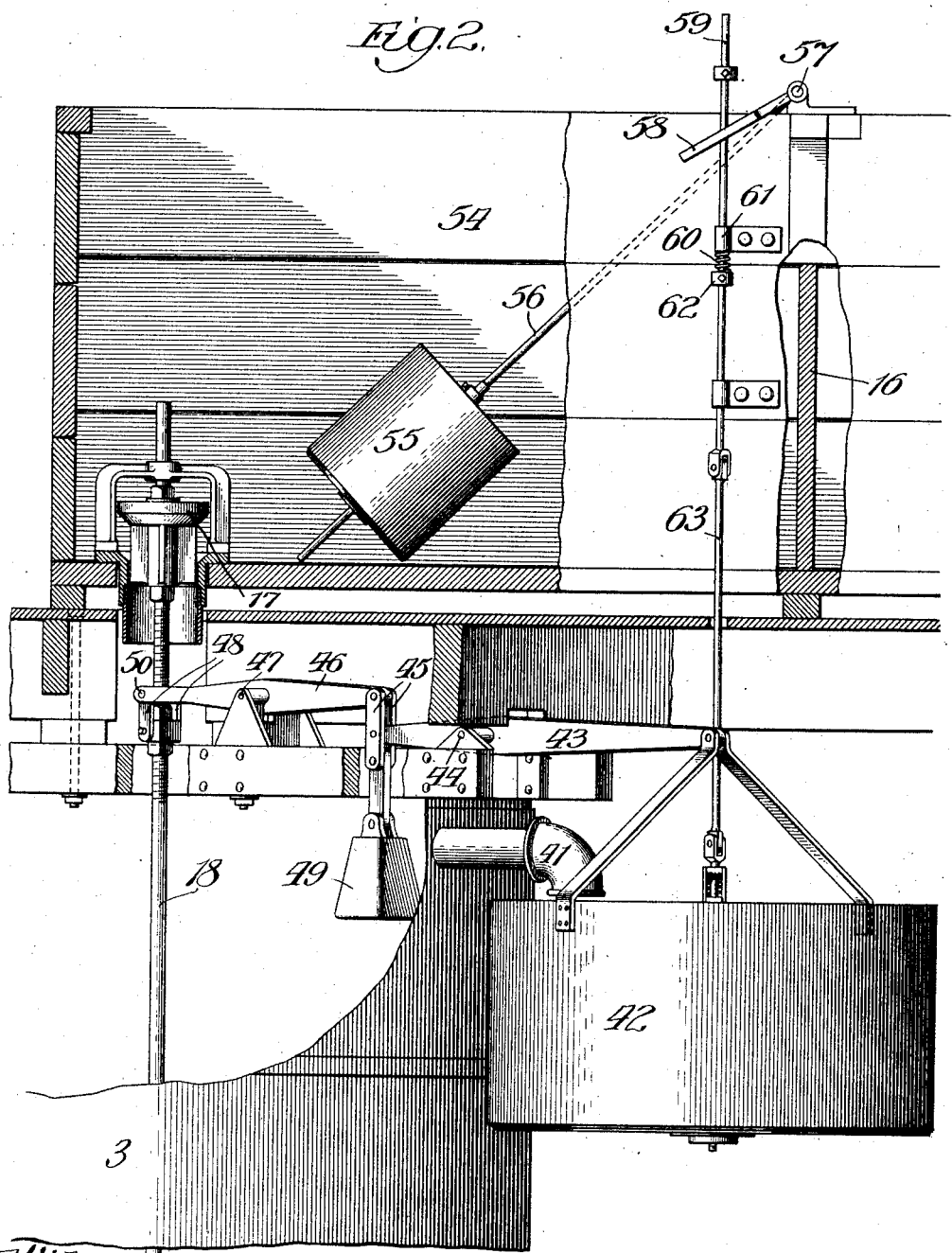
Figure 3:
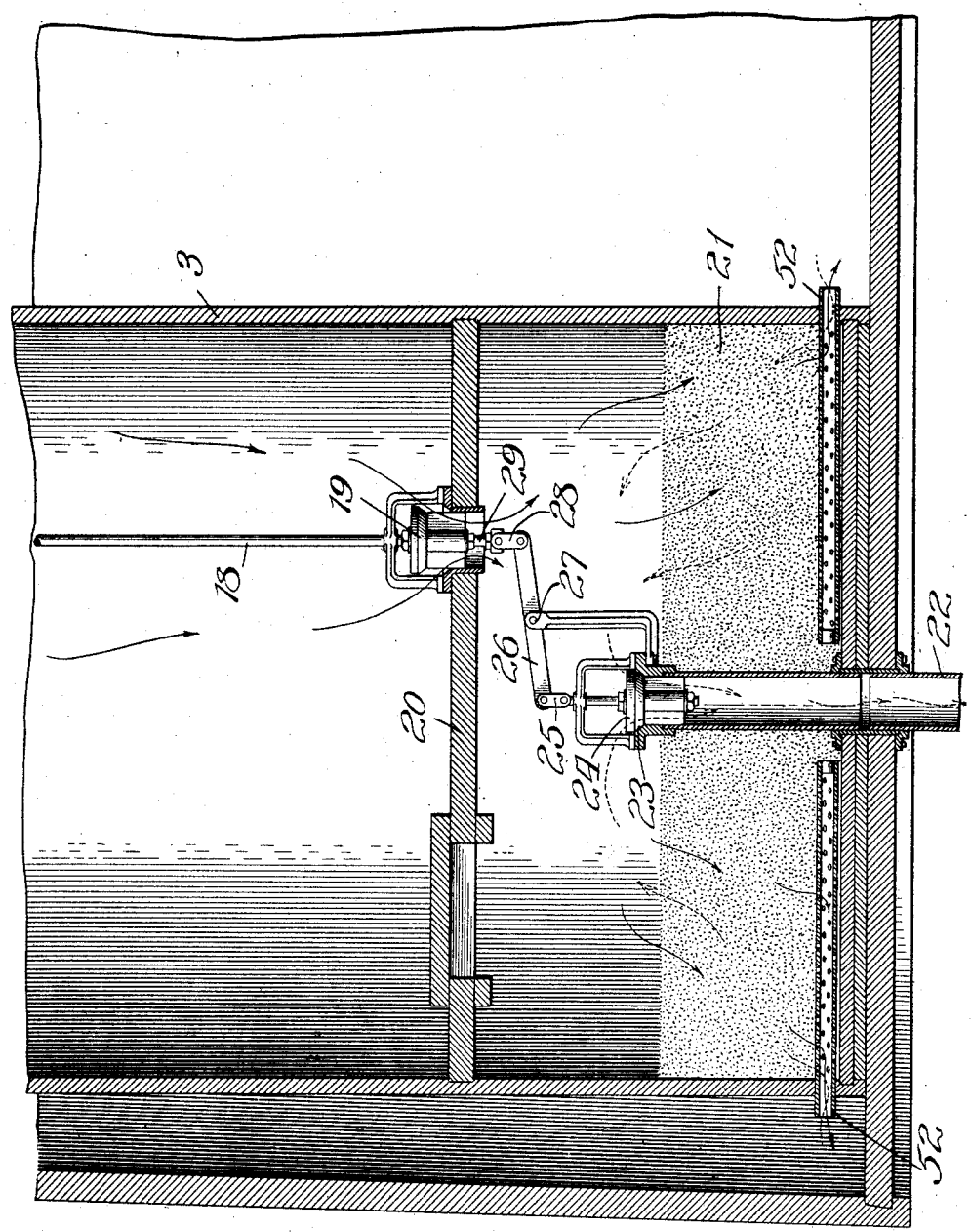

In the drawings—Figure 1 is an elevation, partly in section, of my improved apparatus. Fig. 2 is a detail view of the mechanism for controlling the valve at the bottom of the mixing tank. Fig. 3 is a detail view of the filter and the means for controlling the inlet and drain valves. Fig. 4 is a detail view of the bucket which controls the movements of the mixing tank valve. Fig. 5 is a detail view of the discharge pipes which empty into the mixing tanks.

My improved apparatus is inclosed in a railway roadside tank 1 of the ordinary type, and consists generally of a mixing tank 2 located at the top of the tank 1 and a precipitation and filtering tank 3, extending substantially throughout the height of the tank 1. The water to be treated is discharged into the mixing tank through the inlet pipe 4. The chemical solution is conducted to the mixing tank through the pipe 5, and air for the aeration and mixing of the contents of the mixing chamber is supplied through the pipe 6. The pipes 5 and 6 join at the point 7 and have a common outlet 8. The pipe 4 communicates with any convenient source of water under pressure, such as a city main, or a pump, as indicated by the numeral 10. The incoming water passes through a measuring device 12, which actuates a chemical pump 13 and an air pump 14. The measuring device and pumps operated by it are not claimed in this application, but form the subject-matter of my companion application Serial No. 364,644, filed the 26th day of March, 1907. Detailed description of this part of my invention is, therefore, unnecessary in this application.

The function of the mixing tank 2 is to afford means for thoroughly intermixing the water and chemical solution prior to their introduction to the precipitation and filtering tank 3. In order to promote thorough intermixture of the ingredients and to form a float chamber 54, a partition 16 is provided extending about half the height of the tank 2 and situated near the outlet thereof. The flow of water from the tank 2 to the tank 3 is controlled by the upwardly opening valve 17. The valve 17 is connected through the rod 18 with the valve 19. Located near the bottom of the tank 3 is a false bottom 20. The flow of water from the upper part of the precipitation tank 3 to the filter 21 is controlled by the valve 19. Leading from the upper side of the filter 21 is a drain pipe 22 which either empties upon the ground or is connected with a sewer. A valve seat 23 is formed at the upper end of the pipe 22. Coacting with the valve seat 23 is a valve 24, pivotally connected through link 25 with lever 26. The lever 26 is fulcrumed upon the fixed support 27 and at its opposite end is pivotally connected through the link 28 with the downwardly extending stem 29 of the valve 19.

Through the mechanism above described, it is apparent that when the valve 17 is raised the valve 19 will also be raised and the valve 24 will be lowered, and when the valve 17 is lowered the valve 19 will also be lowered and the valve 24 will be raised. The movement of these valves is controlled by the mechanism illustrated in Fig. 2 of the drawings, the purpose of which is to close the valves 17 and 19 and open the valve 24 when the filter has become clogged with sludge. When the valves have been operated in this manner, the water in the main storage tank 1 will flow in a reverse direction through the filter 21 and will wash the sludge out of the same and carry it away through the drain pipe 22. The mechanism shown in Fig. 2 and about to be described is also operative to close the valve 24 and open the valves 19 and 17 after the filter has been properly washed, thus restoring the normal operation of the mechanism.

Located near the top of the precipitation and filtering tank 3 is an overflow pipe 41 designed, when the filter becomes clogged with sludge, to discharge the overflow of the tank 3 into the bucket 42. The bucket 42 depends from the outer end of lever 43, which is pivoted to a fixed point 44. The inner end of lever 44 is pivotally connected through links 45 with lever 46. Lever 46 is fulcrumed upon a fixed point 47 and at its inner end is pivotally connected through links 48 with the rod 18, which, as above stated, connects valves 17 and 19. The bucket 42 is normally held in elevated position by a counterweight 49 which depends from the inner end of the lever 43. The weight of the water discharged into the bucket 42 when the filter becomes clogged causes the outer end of the lever 43 to descend and through the intermediate connections causes the inner end 50 of the lever 46 to descend, thus carrying the rod 18 downward and closing the valves 17 and 19, and through the lever 26 opens the valve 24. The closing of the valve 19 removes from the filter the pressure of water in the precipitation and filtering tank 3, thereby permitting the water in the main storage reservoir 1 to flow in a backward direction, as indicated by the dotted arrows in Fig. 3, through the perforated pipes 52 and filter 21 and outwardly through the drain pipe 22. This reverse flow of water through the filter carries with it the accumulated sludge and flushes the same out through the drain pipe 22.

Upon the closing of the valve 17 in the manner above described, there is an accumulation of water in the space 54 at the left of the partition 16 in the mixing tank 2. A float 55 is secured to an arm 56, which is fixedly secured to a rock shaft 57 at the top of the mixing tank. Also attached to the rock shaft 57 is a forked arm 58, the prongs of the fork embracing a vertically slidable rod 59, which rod is normally held in its lowermost position by a spring 60 bearing at one end against a fixed abutment 61 and at the other against a collar 62 on the stem 59. The lower end of the stem 59 is connected through link 63 with the upwardly projecting stem 64 of the upwardly opening valve 65 in the bottom of the bucket 42. It will be apparent that as the level of the water in the space 54 at the left of the partition 16 rises the float 55 will be carried upwardly, thereby causing an upward movement of the forked arm 58 and raising the stem 59. The raising of the stem 59 has the effect of opening the valve 65 in the bottom of the bucket 42 and permitting its contents to discharge into the main storage reservoir 1. Upon the discharge of water from the bucket 42 the counterweight 49 drops, thus raising the bucket 42 and the stem 18. The movement of the stem 18 opens the valves 17 and 19 and closes the valve 24, thus closing the drain pipe 22 and again permitting water to flow from the mixing tank 2 to the precipitation and filtering tank 3, thence downward through the valve 19 and filter into the main storage reservoir.

The mechanism above described affords means for reversing the flow of water through the filter when the same has become clogged with sludge and for discharging the sludge through a drain pipe, and thereafter automatically restoring the normal operation of the filter. The apparatus being of simple construction and automatic in operation is inexpensive both as to first cost and maintenance, and can be successfully operated by unskilled laborers.

I claim:

1. A water purifying apparatus comprising a mixing tank, a precipitation tank below the mixing tank, a filter, and means operative when the filter becomes clogged to stop the flow of water from the mixing tank to the precipitation tank.

2. A water purifying apparatus comprising a mixing tank, a precipitation tank below the mixing tank, a filter, and means operative when the filter becomes clogged to stop the flow of water from the mixing tank to the precipitation tank and from the precipitation tank to the filter.

3. A water purifying apparatus comprising a mixing tank, a precipitation tank below the mixing tank, a filter, and means operative when the filter becomes clogged to stop the flow of water from the mixing tank to the precipitation tank and to reverse the flow of water through the filter and discharge from the apparatus such water together with the sludge washed from the filter.

4. A water purifying apparatus comprising a mixing tank, a precipitation tank below the mixing tank, a filter, and means operative when the filter becomes clogged to stop the flow of water from the mixing tank to the precipitation tank and from the precipitation tank to the filter, and to reverse the flow of water through the filter and discharge from the apparatus such water together with the sludge washed from the filter.

5. A water purifying apparatus comprising a mixing tank, a precipitation tank and a filter, a valve between the mixing tank and the precipitation tank, a valve between the precipitation tank and the filter, a pipe leading from the inner side of the filter to a point outside of the apparatus and a drain valve in said pipe, and means operated by the clogging of the filter to close the valves between the mixing tank and precipitation tank and between the precipitation tank and the filter and to open the drain valve.

6. A water purifying apparatus comprising a mixing tank, a precipitation tank and a filter, a valve between the mixing tank and the precipitation tank, a valve between the precipitation tank and the filter, a pipe leading from the upper side of the filter to a point outside of the apparatus and a drain valve in said pipe, means operated by the clogging of the filter to close the valves between the mixing tank and precipitation tank and between the precipitation tank and the filter and to open the drain valve, and automatic means to restore said valves between the mixing tank and precipitation tank and between the precipitation tank and filter to their open position and to restore the drain valve to its closed position.

7. In a water purifying apparatus, a source of water supply, a storage reservoir, a filter, a normally closed drain passage leading from the upper side of the filter to a point outside of the apparatus, and automatic means to open said drain passage when the filter becomes clogged.

8. In a water purifying apparatus, a source of water supply, a filter, a storage reservoir normally fed from said source of water supply through said filter, a normally closed drain passage leading from the upper side of the filter to a point outside of the apparatus, and means operative when the filter becomes clogged to cause a reverse flow of water from the storage reservoir through the filter and drain pipe.

9. In a water purifying apparatus, a source of water supply, a filter, a storage reservoir normally fed from said source of water supply through said filter, a normally closed drain passage leading from the upper side of the filter to a point outside of the apparatus, means operative when the filter becomes clogged to cause a reverse flow of water from the storage reservoir through the filter and drain pipe, and automatic means to restore the normal operation of the apparatus.

10. In a water purifying apparatus, a mixing tank, a precipitation tank, a filter provided with a drain pipe and a storage reservoir, and means operated by the overflow of the precipitation tank due to the clogging of the filter to close the outlet of the mixing tank and of the precipitation tank and to open said drain pipe and cause a reverse flow of water from the storage tank through the filter and drain pipe.

11. In a water purifying apparatus, a mixing tank, a precipitation tank, a filter provided with a drain pipe and a storage reservoir, means operated by the overflow of the precipitation tank due to the clogging of the filter to close the outlet of the mixing tank and of the precipitation tank and to open said drain pipe and cause a reverse flow of water from the storage tank through the filter and drain pipe, and means operated by the accumulation of water in the mixing tank to restore the normal operation of the apparatus.

12. In a water purifying apparatus, a storage tank, a precipitation tank within said storage tank, a filter at the bottom of the precipitation tank through which the precipitation tank communicates with the storage tank.

13. In a water purifying apparatus, a storage tank, a precipitation tank within said storage tank, a false bottom in said precipitation tank and a filter beneath said false bottom through which the precipitation tank communicates with the storage tank, a drain from the upper side of the filter to the outside of the apparatus, a valved aperture in said false bottom and a valve in said drain, and means operated by the overflow of water from the precipitation tank to close the valve in the false bottom and open the drain valve thereby causing a reverse flow of water from the storage tank through the filter and drain.

14. In a water purifying apparatus, a storage reservoir, a mixing chamber within the same and at the top thereof, a precipitation tank within the storage tank and extending substantially throughout the height thereof, a false bottom in said precipitation tank, a filter below said false bottom, said filter communicating with the storage tank, a valved drain leading from the top of the filter, a valved aperture in said false bottom and a valved outlet leading from the mixing tank to the precipitation tank, the three valves being so connected that the drain valve will be closed when the others are open and open when they are closed, means for normally holding the mixing chamber valve and false bottom valve open and the drain valve closed, means operated by the overflow of water from the precipitation tank to reverse the positions of said valves, and means operated by the accumulation of water in the mixing tank to restore said valves to their original positions.

15. In a water purifying apparatus, a mixing tank, a precipitation tank, a filter provided with a drain and a storage reservoir, valves in the mixing tank, the precipitation tank and drain, means to hold said valves in normal position, a bucket adapted to receive the overflow from the precipitation tank and when full to reverse the position of said valve, and a float in the mixing tank operating by the accumulation of water therein to open a valve in the bottom of said bucket thus restoring the other valves to normal position.

16. In a water purifying apparatus, a mixing chamber, inlets for water chemical reagents and compressed air, an outlet, and a partition between said inlets and the outlet.

17. In a water purifying apparatus, a mixing chamber, an inlet for water, an inlet for chemical reagents, and an inlet for a current of air, and means to deliver the water, chemical reagents and air in definite proportion.

18. In a water purifying apparatus, a mixing tank, an inlet for water, an inlet for chemical reagents, and a source of supply of air under pressure for agitating the liquid in the mixing tank, and means to deliver the water, chemical reagents and air in definite proportion.

MARSHALL MILLER.

Witnesses:
WALTER A. SCOTT,
W. F. JONES.